(12) United States Patent
Martin

(10) Patent No.: US 11,595,623 B2
(45) Date of Patent: Feb. 28, 2023

(54) SPORTING EVENT ENTRY SYSTEM AND METHOD

(71) Applicant: Todd Martin, Lexington, OH (US)

(72) Inventor: Todd Martin, Lexington, OH (US)

( * ) Notice: Subject to any disclaimer, the term of this patent is extended or adjusted under 35 U.S.C. 154(b) by 168 days.

(21) Appl. No.: 17/227,310

(22) Filed: Apr. 10, 2021

(65) Prior Publication Data

US 2021/0233333 A1 Jul. 29, 2021

Related U.S. Application Data

(63) Continuation of application No. 16/622,639, filed as application No. PCT/US2018/056942 on Oct. 22, 2018, now Pat. No. 10,991,168.

(60) Provisional application No. 62/575,448, filed on Oct. 22, 2017.

(51) Int. Cl.
*G07C 1/24* (2006.01)
*H04N 7/18* (2006.01)
*G06V 40/16* (2022.01)
*G06V 10/10* (2022.01)

(52) U.S. Cl.
CPC ............ *H04N 7/188* (2013.01); *G06V 10/10* (2022.01); *G06V 40/171* (2022.01); *G06V 40/172* (2022.01); *G07C 1/24* (2013.01); *H04N 7/181* (2013.01)

(58) Field of Classification Search
CPC ...... G07C 1/24; G06V 40/171; G06V 40/172; G06V 10/10; G06V 20/42; H04N 7/181; H04N 7/188; H04N 5/23206; H04N 5/23219; H04N 5/247; H04N 7/18; G03B 19/02

USPC ........................................................ 382/118
See application file for complete search history.

(56) References Cited

U.S. PATENT DOCUMENTS

| | | | |
|---|---|---|---|
| 4,918,630 A | 4/1990 | Plouff | |
| 6,545,705 B1 | 4/2003 | Sigel et al. | |
| 6,985,875 B1 | 1/2006 | Wolf | |
| 9,330,467 B2 | 5/2016 | Barrett | |
| 10,489,655 B2 | 11/2019 | Martin | |
| 10,991,168 B2 | 4/2021 | Martin | |

(Continued)

FOREIGN PATENT DOCUMENTS

| | | |
|---|---|---|
| CN | 20840202 Y | 11/2006 |
| CN | 201270046 Y | 7/2009 |

(Continued)

OTHER PUBLICATIONS

Wikipedia article (https://en.wikipedia.org/w/index.php?title=facial_recognition_system&oldid=806374926)(10 pages) (dated Oct. 21, 2017).

*Primary Examiner* — Jerome Grant, II
(74) *Attorney, Agent, or Firm* — Todd Martin

(57) ABSTRACT

A system and method for image recognition registration of an athlete into a sporting event. The athlete is registered in the sporting event using image recognition technology. A digital commencement image of the athlete taken by a camera (106) as the athlete crosses a starting line. The digital commencement image is compared with a stored profile image of the athlete to identify the athlete and enter them into the event without the need for the athlete to pre-register for the particular event. Enhanced recognition techniques incorporating pattern recognition may be used to increase identity accuracy.

19 Claims, 6 Drawing Sheets

(56) References Cited

U.S. PATENT DOCUMENTS

| | | |
|---|---|---|
| 11,151,481 B1 | 10/2021 | Sun |
| 2002/0008622 A1 | 1/2002 | Weston |
| 2007/0133844 A1 | 6/2007 | Waehner et al. |
| 2009/0087041 A1 | 4/2009 | Hasebe |
| 2009/0096871 A1 | 4/2009 | Kuwano et al. |
| 2009/0141138 A1 | 6/2009 | DeAngelis |
| 2010/0026809 A1 | 2/2010 | Curry |
| 2010/0158315 A1 | 6/2010 | Martin |
| 2010/0225763 A1 | 9/2010 | Vock et al. |
| 2012/0170427 A1 | 7/2012 | Saunders et al. |
| 2012/0310389 A1 | 12/2012 | Martin |
| 2013/0194427 A1 | 8/2013 | Hunter |
| 2013/0235227 A1 | 9/2013 | Chang |
| 2013/0266181 A1 | 10/2013 | Brewer |
| 2013/0279757 A1 | 10/2013 | Kephart |
| 2014/0002663 A1 | 1/2014 | Garland |
| 2014/0152833 A1 | 6/2014 | Itoi |
| 2014/0266604 A1 | 9/2014 | Masood et al. |
| 2014/0337434 A1 | 11/2014 | Hansen |
| 2015/0120341 A1 | 4/2015 | Scarboroough |
| 2015/0131845 A1 | 5/2015 | Forouhar |
| 2015/0324937 A1 | 11/2015 | Callahan |
| 2016/0004904 A1 | 1/2016 | Senechai |
| 2016/0035143 A1 | 2/2016 | Hansen |
| 2016/0307042 A1 | 10/2016 | Martin |
| 2017/0007882 A1 | 1/2017 | Werner |
| 2017/0161550 A1 | 6/2017 | Ranganath |
| 2018/0001173 A1 | 1/2018 | Cupa |
| 2018/0096209 A1 | 4/2018 | Matsuda |
| 2019/0050631 A1 | 2/2019 | Hayase et al. |
| 2019/0110112 A1 | 4/2019 | Maloney |
| 2019/0290184 A1 | 9/2019 | Matsumura |
| 2020/0273548 A1 | 8/2020 | Wolf |
| 2020/0349249 A1 | 11/2020 | Weston |
| 2020/0372725 A1 | 11/2020 | Martin |
| 2020/0372992 A1 | 11/2020 | Wu |

FOREIGN PATENT DOCUMENTS

| | | | | |
|---|---|---|---|---|
| CN | 201307301 Y | | 9/2009 | |
| CN | 107085695 | * | 8/2017 | ........... G05B 19/418 |
| CN | 107273994 A | | 10/2017 | |
| DE | 10336447 | | 3/2005 | |
| DE | 102006006667 | | 8/2007 | |
| DE | 202014011537 | * | 2/2022 | ............... G07C 1/22 |
| EP | 169393 | | 8/2006 | |
| EP | 2422291 | | 1/2019 | |
| EP | 3422291 | | 1/2019 | |
| JP | 60262286 | | 12/1985 | |
| WO | 2004093022 | | 10/2004 | |

\* cited by examiner

SPORTING EVENT ENTRY SYSTEM AND METHOD

CROSS REFERENCE TO RELATED APPLICATIONS

This application is a continuation of U.S. application Ser. No. 15/622,639, which is a 371 of International Application No. PCT/US2018/056942, which claims the benefit of U.S. Provisional Application No. 62/575,448, the entire contents of each being incorporated by reference herein.

FIELD OF THE INVENTION

The present disclosure relates to improvements in systems for athlete entry or registration into a sporting event.

BACKGROUND OF THE INVENTION

In order to enter or register as a participant for an upcoming sporting event, an athlete will typically visit the event's web page and enter their details prior to the sporting event to become a "pre-registered" athlete. A problem with this method is that sometimes the athlete becomes injured, the weather turns inclement, or other circumstances prohibit or dissuade the athlete from showing up at the race venue and participating. As a result, the non-showing athlete typically loses their entry fee (if one was paid).

Often times, the sporting event will offer "race-day registration" so that athletes wishing to participate and who did not pre-register may enter the sporting event the day of the sporting event. Race-day registration typically involves the athlete showing up at the race venue before the start of the race, filling out a paper entry, and handing the paper entry to a race volunteer or employee. The race volunteer or employee then checks the form, associates a race number with the entry, and hands the race number to the athlete. In most timed events, a timing chip is also handed to the athlete with the race number. In events where an entry fee is charged, the race volunteer also collects a payment from the athlete. Race-day registration minimizes the risk that injury will lead to a wasted entry fee by the athlete, but there are notable problems. For example, a large influx of race-day registrants may overwhelm the limited number of race volunteers or employees, increasing pressure on the volunteers to rush the registration process so that entrants may get to the starting line on time. Race organizers have to guess as to how many race-day registrants might attend, and attempt to plan accordingly. Often times, this leads to not having enough resources, or having too much resources that then go to waste when less than estimated numbers of athletes show up.

What is needed is a system and method that renders the registration process more efficient, minimizes the potential for errors, and is easier to use than conventional systems.

A problem related to athlete entry and participation in a sporting event is athlete identification, particularly where image recognition technology is utilized. While image recognition has proven to be a reliable means to identify a person, sometimes an image is insufficient to accurately identify a person. The image might be too blurry, lighting may be insufficient, or the person might be wearing items which interfere with accurate identification. What is needed is a system and method to enhance the accuracy of identification when image recognition technology is utilized.

SUMMARY

The present disclosure in one aspect sets forth a system for entering an athlete in a sporting event. The system includes a camera configured to capture an image of the athlete commencing the sporting event; an athlete database configured to store a profile image of the athlete prior to commencement of the event; and a processor configured to compare the profile image stored in said athlete database with a commencement image of the athlete captured by said camera, said processor being configured to enter the athlete as a participant in the sporting event based on the comparison between the profile image and the commencement image.

The present disclosure in another aspect sets forth a method of entering an athlete in a sporting event. The method includes capturing a digital profile image of the athlete prior to commencement of the sporting event; associating, with a microprocessor, identification data of the athlete with the athlete's profile image; capturing a digital commencement image of the athlete as the athlete commences the sporting event; and entering the athlete as a participant in the sporting event based on a comparison of the profile image and the commencement image.

In another preferred aspect, the present disclosure sets forth a system for entering an athlete in a sporting event. The system includes a means for capturing an image of the athlete commencing the sporting event; an athlete database configured to store a profile image of the athlete prior to commencement of the event; and a means for entering the athlete as a participant in the sporting event based on the comparison between the profile image and the commencement image. The means for capturing the image of the athlete may include any one or more of a camera, for example, a stand-alone digital camera, a video camera, a thermal camera, and/or a device having an integrated or component camera, such as a tablet computer, a laptop computer, or a mobile communications device such as a smartphone. The means for entering the athlete may include a specially programmed processor configured with image recognition software, more preferably, facial recognition software utilising a recognition algorithm, for example, any one or more of 3-D modelling, geometric and/or photometric approaches, linear discriminate analysis (LDA), system vector machine (SVM), pattern matching, dynamic link matching, thermal imaging, and/or elastic bunch graph matching.

In a further preferred aspect, the present disclosure sets forth a system and method for enhancing the accuracy of identifying a person in an image. The system and method uses elements of artificial intelligence blended with image recognition technology to provide increased accuracy of identification where needed.

As used herein, "configured" includes creating, changing, or modifying a program on a computer or network of computers so that the computer or network of computers behave according to a set of instructions. The programming to accomplish the various embodiments described herein will be apparent to a person of ordinary skill in the art after reviewing the present specification, and for simplicity, is not detailed herein. The programming may be stored on a computer readable medium, such as, but not limited to, a non-transitory computer readable storage medium (for example, hard disk, RAM, ROM, CD-ROM, USB memory stick, or other physical device), and/or the Cloud.

It will be appreciated that in one or more embodiments, the system may include one or more work stations at a back end for use by a platform operator, one or more local client computers for access by users, and a communications network that facilitates communication between the platform, the work stations at the back end, and the client computers.

Preferably, the work stations and client computers will include a display and means for entering information, such as a Graphic User Interface (GUI), a keyboard and/or voice activated data entry. Means for accessing the platform by users may include, but is not limited to personal computers and mobile devices such as tablets and smartphones, and other user devices capable of communicating over a communications network utilizing the Internet.

It will be understood that the term "during" when used to describe the participation of an athlete or user in a race, competition and/or sporting event includes the time from the start up to and including the finish of the athlete or user in the race, competition or sporting event, unless that athlete or user drops out (does not finish). Races, competitions and/or sporting events may include, but are not limited to running races, bike races, swim meets, triathlons, duathlons and other competitions pitting an individual or team against other individuals or teams.

It is to be understood that both the foregoing general description and the following detailed description are exemplary and explanatory only and are not restrictive of the invention, as claimed, unless otherwise stated. In the present specification and claims, the word "comprising" and its derivatives including "comprises" and "comprise" include each of the stated integers, but does not exclude the inclusion of one or more further integers. The phrase "only image recognition" or "only facial recognition" excludes the use of peripheral items such as bib numbers and RFID chips to identify an individual in the first instance, but does not exclude enhanced recognition processes utilizing artificial intelligence. The claims as filed with this application are hereby incorporated by reference in the description.

The accompanying drawings, which are incorporated in and constitute a part of this specification, illustrate several embodiments of the invention and together with the description, serve to explain the principles of one or more forms of the invention.

DETAILED DESCRIPTION OF THE DRAWINGS

Reference will now be made in detail to exemplary embodiments of the invention, some of which are illustrated in the accompanying drawings.

FIGS. 1 to 4 show a preferred embodiment of a system 100 having a processor 102, an electronic athlete database 104, and at least one digital image collection device 106. In use, a digital profile image of a user is captured and stored in electronic athlete database 104 prior to the start of the sporting event or race. The user shows up to the race venue the day of the race. An image collection device 106 located proximate the starting line of the race captures a commencement image of the user, which is compared by processor 102 with the profile image stored on database 104 to identify the user. Once the user is identified at the race, the user is recorded as a participant, and is charged an entry fee (if applicable), for example, just by crossing the starting line. A commencement time is associated with the user's commencement image. As the user is finishing, a finish image is captured by another digital image collection device 106. The commencement and finish images are preferably time stamped so that the user's time is determined by a comparison of the commencement and finish images. The preferred elements of system 100 and their interrelationship are described below.

Figure 1:
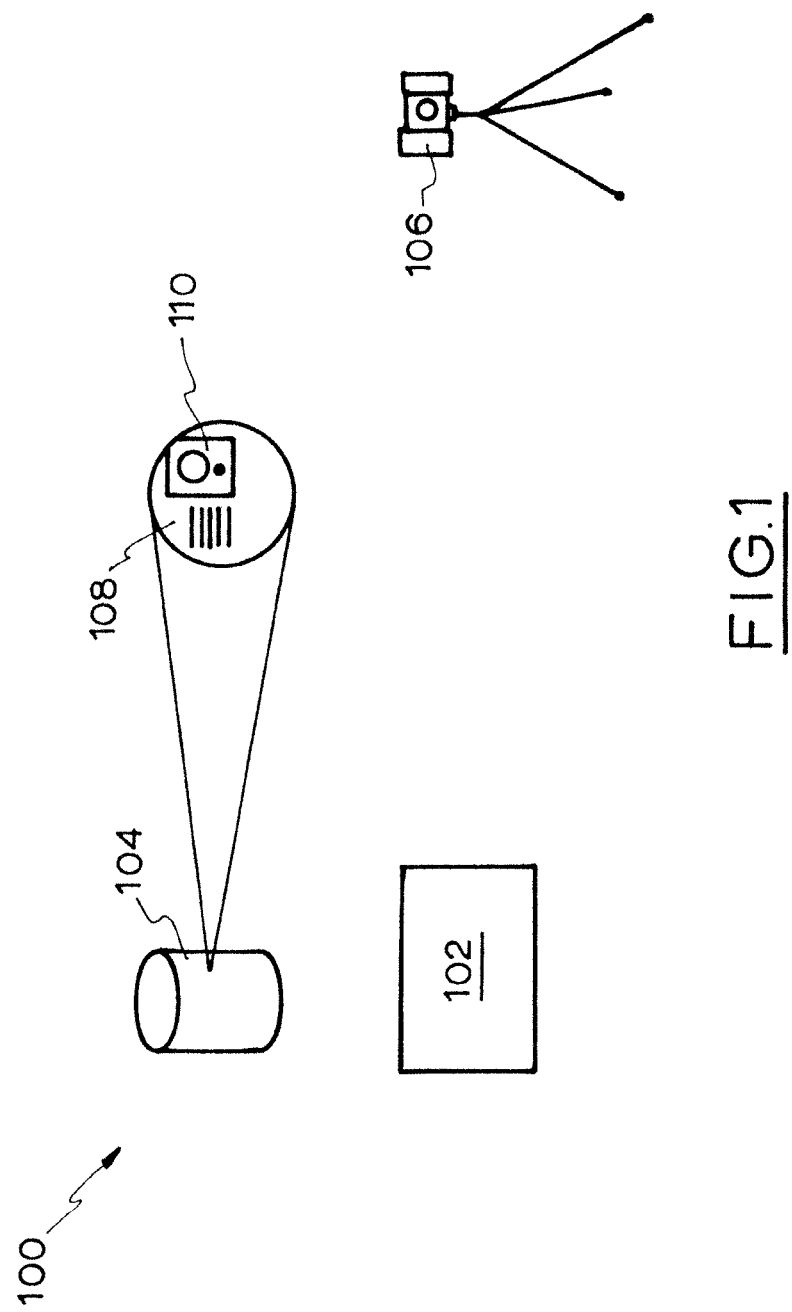
FIG. 1 is a diagram of system components in accordance with an embodiment of the disclosure.

Referring to FIG. 1, system 100 is preferably a stand-alone system which may be in communication with the internet if desired. Processor 102 may be in the form of a microcomputer such as a laptop computer. Processor 102 preferably includes a microchip, such as a System on Chip (SoC), with appropriate control circuitry. Processor 102 preferably includes image recognition technology so that images may be compared with each other to ascertain a match. More preferably, processor 102 includes facial recognition technology for comparing facial images of individuals. Examples of suitable recognition algorithms include 3-D modelling, geometric and/or photometric approaches, linear discriminate analysis (LDA), system vector machine (SVM), pattern matching, dynamic link matching, thermal imaging, and/or elastic bunch graph matching. The details of image recognition technology would be appreciated by those of ordinary skill in the art and are therefore not repeated here for simplicity.

Electronic athlete database 104 is preferably configured with a plurality of user profiles 108 with fields for user identification data such as name, address and contact details (electronic and telephone). Each user profile 108 preferably includes a provision for a digital profile image 110 for association with each user. Profile image 110 is preferably a picture that contains at least a portion of the user. Each user profile 108 also preferably includes payment information associated with the user, for example, credit card information, or some other form of electronic payment or account information. A ledger of event entries for each user may be maintained using blockchain technology if desired.

Profile 108 may be configured to automatically self-delete after a predetermined amount of time and/or after a predetermined action or event. For example, profile 108 may delete after a fixed time period of 1 month, 1 year or 3 years in order to help ensure that a profile picture is kept up to date, or address privacy concerns. Profile 108 may self-delete after an event, such as a sporting event in which the user is registered.

System 100 further preferably includes at least one digital image collection device 106. Digital image collection device 106 may be any device configured to capture a digital image, such as, but not limited to a camera, for example, a stand-alone digital camera, a video camera, a thermal camera, and/or a device having an integrated or component camera, such as a tablet computer, a laptop computer, or a mobile communications device such as a smartphone. Digital images captured by the digital image collection device may be stored on a computer-readable storage medium associated with processor 102 (for example, hard disk, server, Cloud); and/or a computer-readable storage medium associated with the digital image collection device; and/or a separate, transferable computer-readable storage medium (for example, flash drive (USB) or disc). Images may include static images or frames from a video.

Digital image collection device 106 may be adapted for depth-detection and may include a laser and/or a 3-D rangefinder to facilitate depth detection.

In use, a user creates a digital personal profile. The user provides their identity data into predefined fields and uploads a profile picture to database 104. The user may provide payment information as part of the profile creation process. Once the user has established their profile on database 104, the user may attend and compete in the sporting event.

Figure 2:
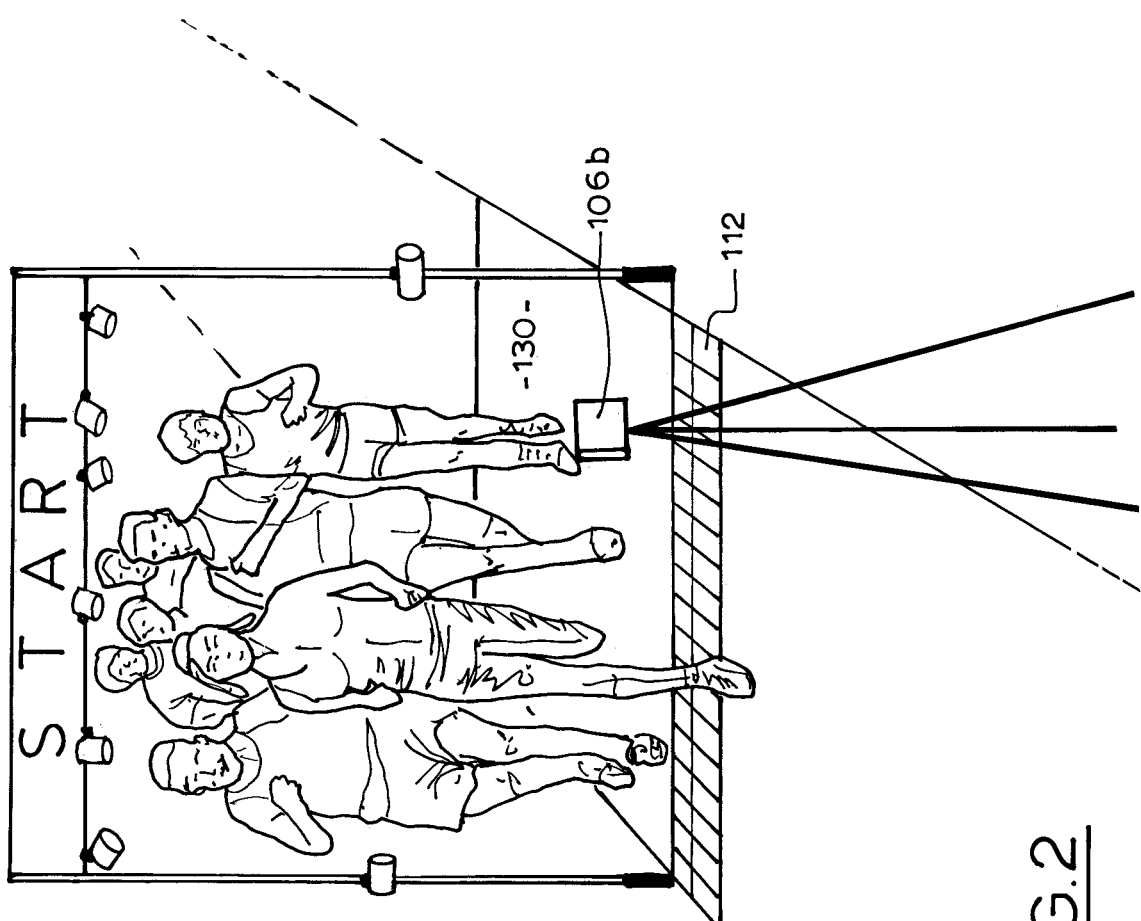
FIG. 2 is a pictorial view of an athlete crossing the start of a race course.

Referring to FIG. 2, image collection devices 106 may be arranged in a variety of positions to optimally capture an athlete's image. For example, a series of alternating cameras may be positioned along an elevated or overhead position at or proximate start 112 to capture forward and/or overhead perspective views of an athlete approaching and crossing the start. Additional cameras may be positioned medially and/or laterally (left and/or right) of the start, and/or forward of the start. Proximate the starting line, one or more cameras 106b may be positioned at a lower elevation so that the digital commencement image is captured at an angle below a horizontal plane intersecting a chin of the athlete, or where desired, below a horizontal plane intersecting a waist of an athlete. Other camera angles may be used as desired.

It will be appreciated that it is not always practical to position an image collection device directly in the path of an oncoming athlete. Processor 102 may be configured with one or more recognition algorithms suitable for side, or angled side profiles. Such algorithms may be modified to compare the distance between a point on the ear (e.g., concha or lobule) and a point on the eye (e.g., iris), and/or the distance between a point on the ear and a point on a nose (e.g., tip), and/or a ratio comparing the distance between a point on the ear and eye and the distance between a point on the ear and the nose. Where opposed cameras are used to capture left side, right side and/or oblique profiles of the athlete, the images captured by each camera may either be individually analyzed, or more preferably, merged to generate a composite image which is analyzed.

Figure 3:
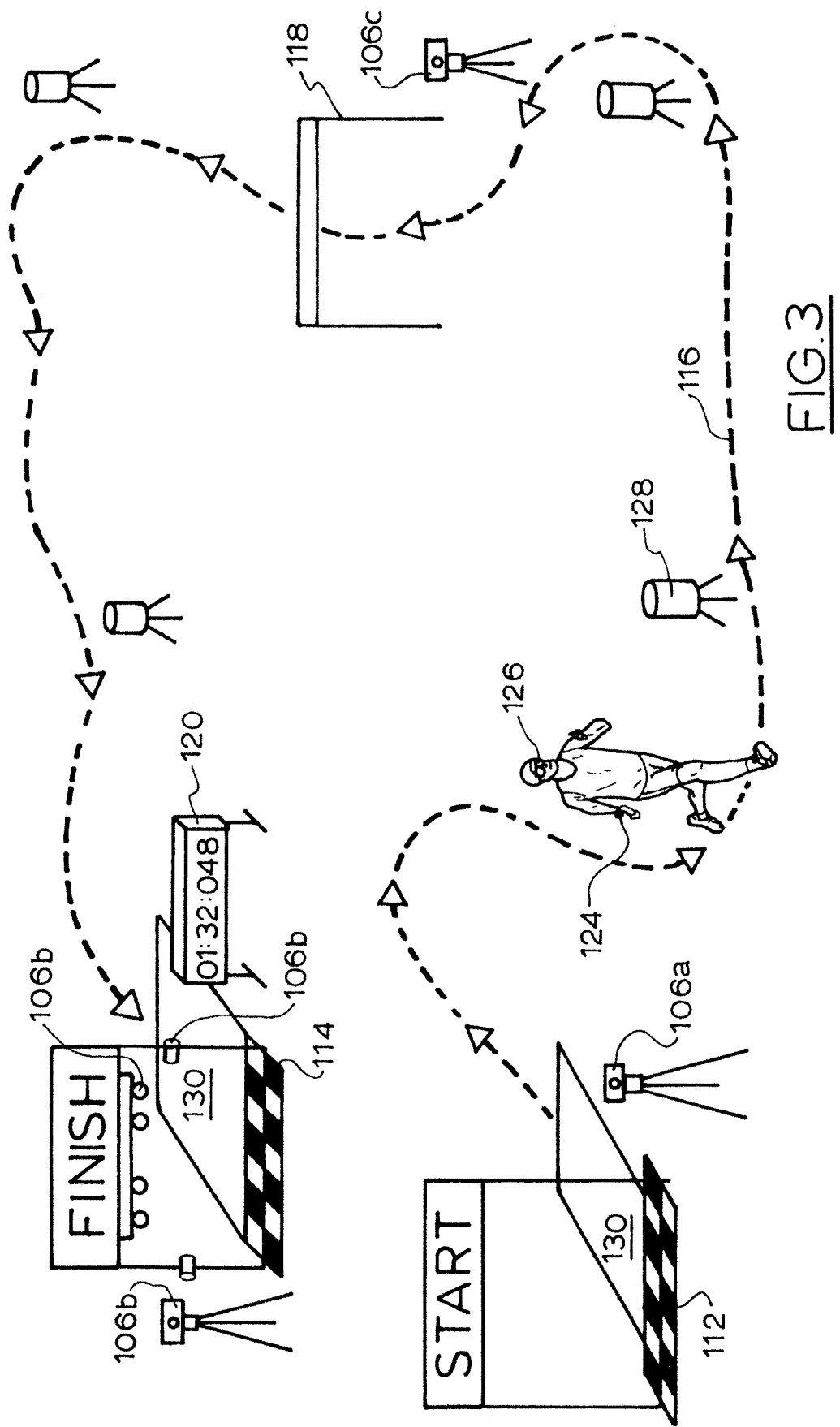
FIG. 3 is a pictorial view of the system of FIG. 1 shown along a race course of a sporting event.

Referring to FIG. 3, at the sporting event, a digital image collection device 106a is preferably positioned adjacent or nearby a starting line 112. At least a second digital image collection device 106b is preferably positioned adjacent or nearby a finish line 114. A third digital image collection device 106c may be positioned somewhere intermediate the start and the finish if desired. In use, the user commences the race and crosses starting line 112. Digital image collection device 106a captures a digital commencement image of the user and preferably assigns or associates a time with the image, for example, by time-stamping the image. The time may be time of day or over-all race time. Processor 102 compares the commencement image with profile images in database 104 to identify the participant. Once identified, the user is listed as a participant and charged (if payment is required) according to the payment details associated with the user's profile. While traversing race course 116, the user may be directed through a photo zone 118 so that another digital image may be captured using digital image collection device 106c. A split time may be assigned with the image if desired. As the user crosses the finishing line, digital image collection device 106b preferably captures a finish image of the user, which is assigned or time-stamped with a finish time by either image capture device 106 or processor 102. The finish time may be the same as that shown or displayed on race time clock 120 (preferably managed by a timing company), or may be a time of day.

With continued reference to FIG. 3, system 100 may be configured to identify and track a wearable device on the athlete so that as the athlete participates in the sporting event, the system will track the athlete's position along the course. Examples of wearable devices include, but are not limited to, a timing chip, a smartphone, a watch 124, a device insertable in a shoe, and eyewear 126. Watch 124 may include GPS circuitry and/or a wireless radio transmitter for network Wi-Fi communications and/or peer-to-peer communications, as will be further described below. Where the user elects to use their own device (and not a timing chip provided by a timing company), they may register the device (e.g., provide the device identification to the timing company) prior to commencement of the sporting event. Thereafter, a communications interface forming part of the system may be used to collect data via a communications means such as satellite, cellular technology, NFC, WLAN, and/or peer-to-peer communications (e.g., Bluetooth and/or Wi-Fi Direct) from the athlete as the athlete moves along the course. The athlete's participation data may be directly uploaded into the system from the athlete's own personal device. Where the wearable device utilises a peer-to-peer technology such as Bluetooth and/or Wi-Fi Direct, sensors 128 with appropriately configured transceivers may be positioned along the course as appropriate for the communications range of such devices. Examples of suitable sensors include Bluetooth beacons. The details of Bluetooth beacons would be appreciated by those of ordinary skill in the art and are therefore not repeated here for simplicity.

If desired, a secondary means of identification may be used to identify an athlete. For example, system 100 may include a digital foot recognition mat 130 configured to capture an image of the bottom of an athlete's shoe for comparison with an image stored on database 104. The bottom of a shoe, unless brand new, will show the wear pattern of an athlete. Mat 130 preferably contains a sensor network which is adapted to capture images of multiple athletes as they step on the mat. The tread pattern of the particular brand of shoe, combined with the wear pattern of the wearer, provides a reasonably reliable means of identification of the athlete wearing the shoe. Other secondary identification means may include a registered personal device (e.g., watch, smartphone, eyewear, etc.) such as described above, a timing chip, and/or race number.

Figure 4:
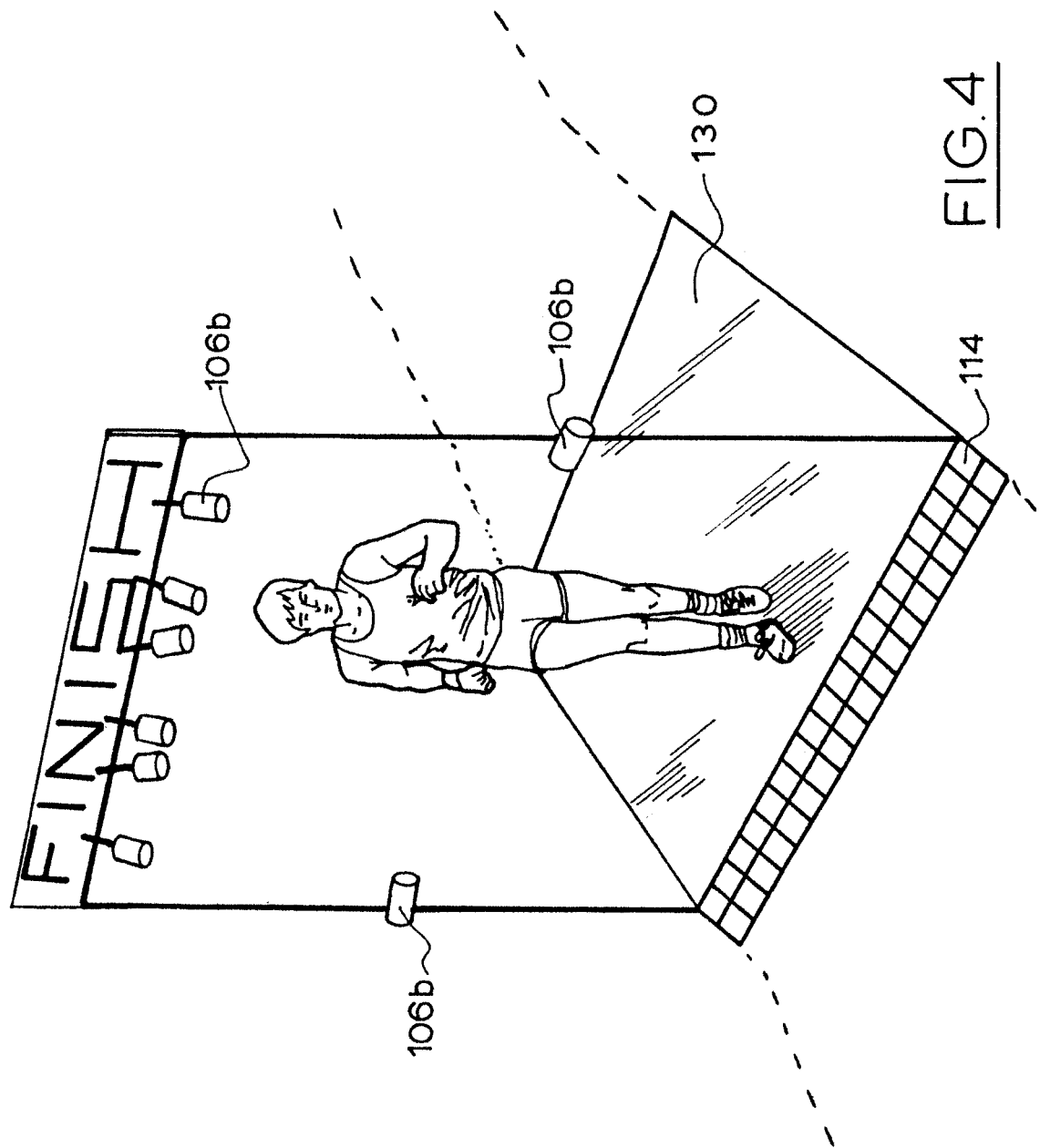
FIG. 4 is a pictorial view of an athlete crossing the finish of the race course of FIG. 3.
Figure 5:
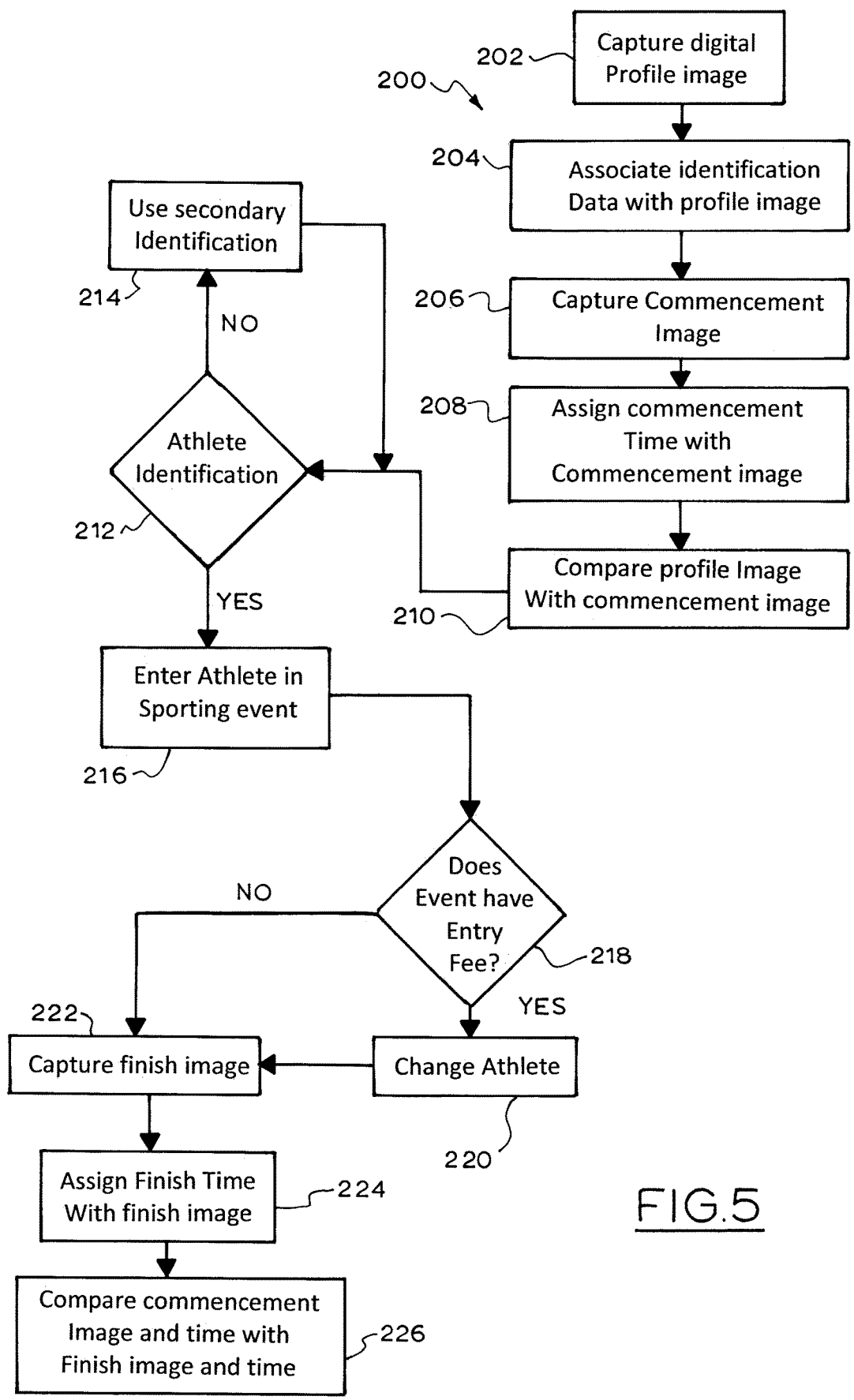
FIG. 5 is a flow diagram of a method for entering an athlete in a sporting event in accordance with an embodiment of the disclosure.

Referring to FIG. 4, image collection devices 106 may be arranged in a variety of positions to optimally capture an athlete's image at the finish. For example, a series of alternating cameras 106b may be positioned along an elevated or overhead position at or proximate finish 114 to capture forward, overhead and/or rear perspective views of an athlete approaching and crossing the finish. Additional cameras may be positioned medially and/or laterally of the finish, and/or forward of the finish.

Where multiple image collection devices are utilized, the image collection devices may be adapted to form a wired or wireless peer-to-peer network with each other and/or with processor 102. For example, each camera 106b shown in FIGS. 2 and 4 may include a radio transceiver configured for Bluetooth and/or Wi-Fi Direct communications with other cameras and/or processor 102.

The user's total race time may be determined by comparing the commencement image with the finish image and comparing the times associated with each image (i.e., subtracting the commencement time from the finish time of the user). Each participant may be identified by comparing at least one of the sporting event images with a profile image using image recognition technology. Preferably the determination is conducted without the use of bib numbers or timing chips. More preferably, the identification is made using solely the images of the athlete. Most preferably, the images are matched with users using facial recognition technology, the details of which would be appreciated by those of ordinary skill in the art. An example of an image recognition timing system and method is described in PCT Publication No. WO2015/088795, the entire contents of which is incorporated by reference herein. If desired, more than one category of features may be used as part of the image recognition process. For example, facial features and at least one non-facial feature may be used to identify a user in a digital image captured during the sporting event. For example, a portion of an article of clothing may be used in combination with a facial feature to assist in identifying a user as a participant.

Other personal features may be used to identify an athlete in instances where the face may be partially or totally obscured. For example, head dimensions (for example, the distance between the ears), the distance between the ends of the shoulders, thermal imaging, and/or general body shape (for example, torso width and/or body height) may be used to help identify an athlete.

Athlete identification may be enhanced by incorporating pattern recognition and machine learning algorithms into the system. Behaviour and non-behaviour features may be analyzed to increase accuracy of identification. Examples of behaviour features include past participation history in a sporting event (e.g., an athlete competing in an annual sporting event multiple times), calendar events (e.g., athlete travel periods, and sporting event type (e.g., duathlon, marathon, etc.). Examples of non-behavioural features include biometric data (e.g., age, gender, body build) and geolocation data (residential location, sporting event location). Behaviour, non-behaviour, or any combination behaviour and non-behaviour features may be used to enhance athlete identification.

The features may be weighted to increase accuracy. For example, competition history may be given an initial weighting of 50%, geolocation may be given a weighting of 35%, calendar event(s) given a weighting of 10%, and biometric data given a weighting of 5%. Where geolocation is used as a factor, an athlete's residential address (obtained from profile 108) may serve as an initial a geolocation point with a fixed radius to define a surrounding target area. Sporting events located within the target area are given a higher weighting. Sporting events tending to match the athlete's past type of sporting event participation (e.g., a 10K road race, or a sprint triathlon) are given a higher weighting. Pattern recognition of increased training as evidenced by data from an online training log may be used to suggest a longer endurance event, or an important championship event. Pattern recognition may also be used to weight an athlete's likelihood of participating in a particular event where the athlete has previously participated, with increased past participation in an event being used to increase the weight given towards a particular event.

As a practical example, if an image of an athlete is captured at the start, whether for registration purposes and/or timing, and the image is partially obscured, or the image only provides, for example, a 98% identification accuracy, processor 102 may utilize an enhanced recognition algorithm with a feature set including participation history, geolocation data, calendar event data and biometric data to increase the accuracy and positive identification rate. The processor may be configured to check whether the individual is already recognized, and if not, then scan the database for individuals who have a residence within the target area of the race, who have participated in the current event (if it is a regular or annual event), who have a history of participating in the same or similar event type and distance, and biometric features such as gender, age, and body type. The features may be weighted and varied in order to optimize accuracy (e.g., geolocation being weighted more than event participation history).

Enhanced recognition may be used at the start, at the finish, or at any point where there is a camera. The increased recognition may be used for event registration and/or for timing the athlete.

It will be appreciated that pattern recognition and machine learning may be implemented through appropriate classifiers, such as an artificial neural network. The basic details of machine learning and pattern recognition methods would be understood by those of ordinary skill in the art and are therefore not repeated here for simplicity.

Having described the preferred components of system 100, a preferred method 200 for entering an athlete into a sporting event will now be described with reference to FIGS. 1 to 5. The method preferably includes the step 202 of capturing a digital profile image of the athlete prior to commencement of the sporting event with an image collection device such as a camera. Next, at step 204, a digital personal profile is created which includes the digital profile image, identity data, and preferably, payment information. Examples of identity data include, but are not limited to, name and/or contact details such as address, phone number and/or social media account information. Examples of payment information include credit or debit card details, PayPal, or other electronic payment account details. Step 206 includes capturing, with an image collection device, a digital commencement image of the athlete as the athlete commences the sporting event. For example, referring to FIG. 2, as the athlete crosses starting line 112, camera 106*b* captures a commencement image of the athlete. Step 208 includes assigning a commencement time with athlete's commencement image, for example, by time-stamping or tagging the image. Step 210 includes identifying the athlete by comparing, with a processor, the profile image of the athlete with the athlete's commencement image. Preferably the step of identifying is conducted without the use of any timing chip or race number bib. Preferably, the step of identifying is conducted using only image recognition, more preferably, only facial recognition. Enhanced recognition utilizing artificial intelligence may be used as a supplement to enhance accuracy of identification if desired, or as set forth below, as a secondary method of identification where image or facial recognition provides inadequate accuracy for a given image.

In step 212, it is determined whether the athlete in a captured image has been identified. If the athlete has not been identified, then in step 214, one or more secondary methods of identification are used to identify the athlete. Examples of secondary methods include the use of a chip or race number (if worn), the use of a device which has been registered with the system such as a smartwatch, bracelet and/or eyewear, and/or use of mat 130 as described above. Enhanced recognition utilizing artificial intelligence may be used as a secondary method of identification if desired. If the athlete is identified, then in step 216, the athlete is designated as registered and entered into the sporting event. In step 218, it is determined whether an entry fee is applicable. If an entry fee is applicable, then in step 220 the athlete is charged the entry fee using the athlete's payment information associated with the digital personal profile. A ledger of payment transactions may be recorded using blockchain technology.

After determining whether an entry fee is applicable, and payment made (if applicable), in step 222, a digital finish image of the athlete is captured, with an image collection device, as the athlete finishes the sporting event. For example, referring to FIGS. 3 and 4, as the athlete crosses finish line 114, one or more of cameras 106*b* capture an image of the athlete. Step 224 includes assigning a finish time with the athlete's finish image, for example, by time-stamping or tagging the image. Step 226 includes determining the athlete's race time by comparing, with a processor, the commencement image and commencement time of the athlete with the finish image and finish time of the athlete, and subtracting the commencement time from the athlete's finish time. For example, commencement time from the time stamp associated with the commencement image may be subtracted from the finish time from the time stamp associated with the finish image to obtain the athlete's race time. The method further preferably includes forwarding a link to the athlete identified in one of the images captured during the sporting event and providing the athlete with an opportunity to purchase at least one image of the athlete identified in the image. The method further preferably includes storing a purchased image of the athlete in an online database selectively accessible by the athlete.

It will be appreciated that the steps described above may be performed in a different order, varied, or some steps added or omitted entirely without departing from the scope of the disclosure. For example, where a secondary identification method is utilized, the athlete may be asked to register their own personal device (e.g., watch, eyewear, smartphone, bracelet) with the system prior to commencement of the competition. The athlete may, for example, pre-register a device identification using a remote terminal over the internet with the system, and/or register the device onsite by using the on-board communications of the device to register with an appropriate system interface, using, for example, Near Field Communications (NFC), WLAN, Bluetooth and/or Wi-Fi Direct. In a preferred embodiment, a wearable device relying on RFID technology for device identification is expressly excluded. Instead of using an athlete's particular commencement time in the determination of the athlete's race time, the commencement time may be assigned a default value of zero so that the athlete's race time is the actual race clock time (i.e., the over-all race time). This may be suitable where the number of participants is small. The step of charging the athlete an entry fee may occur when the athlete crosses the starting line, sometime after the athlete crosses the starting line and before the athlete crosses a finish line, as the athlete crosses the finish line, or after the athlete finishes the sporting event.

Additional steps may be included if desired. For example, a pre-registration check may be conducted to ascertain whether the athlete pre-registered for the event. If the pre-registration check indicates that the athlete already registered for the sporting event (e.g., not race-day registration), then any image of the athlete captured by any event camera may be used to identify and time the athlete without any need for a race-day registration check.

In another preferred embodiment, system 100 may form part of a web platform accessible over a communications network by one or more client computers and/or mobile devices, such as laptops, tablets, smartphones, and/or wearable smart device. Electronic athlete database 104 may be configured to preferably maintain and store a plurality of user profiles 108 that may be populated by users over the internet. Each user profile 108 preferably includes identification data and a profile image 110 of the user preferably uploaded to the platform by the user.

If desired, any commercial transaction to purchase the media may be conducted by the platform. For example, if a user is interested in purchasing media content in which their image appears, the user may access a link associated with the thumbnail image of interest. The activated link will bring the user to a page where the user may order the media. Thereafter, the user may select a delivery option, such as e-mailing the media content to the user's e-mail account, or transferring the media content to a limited access area associated with the user's account on the platform, such as photo album 136 in FIG. 6.

Figure 6:
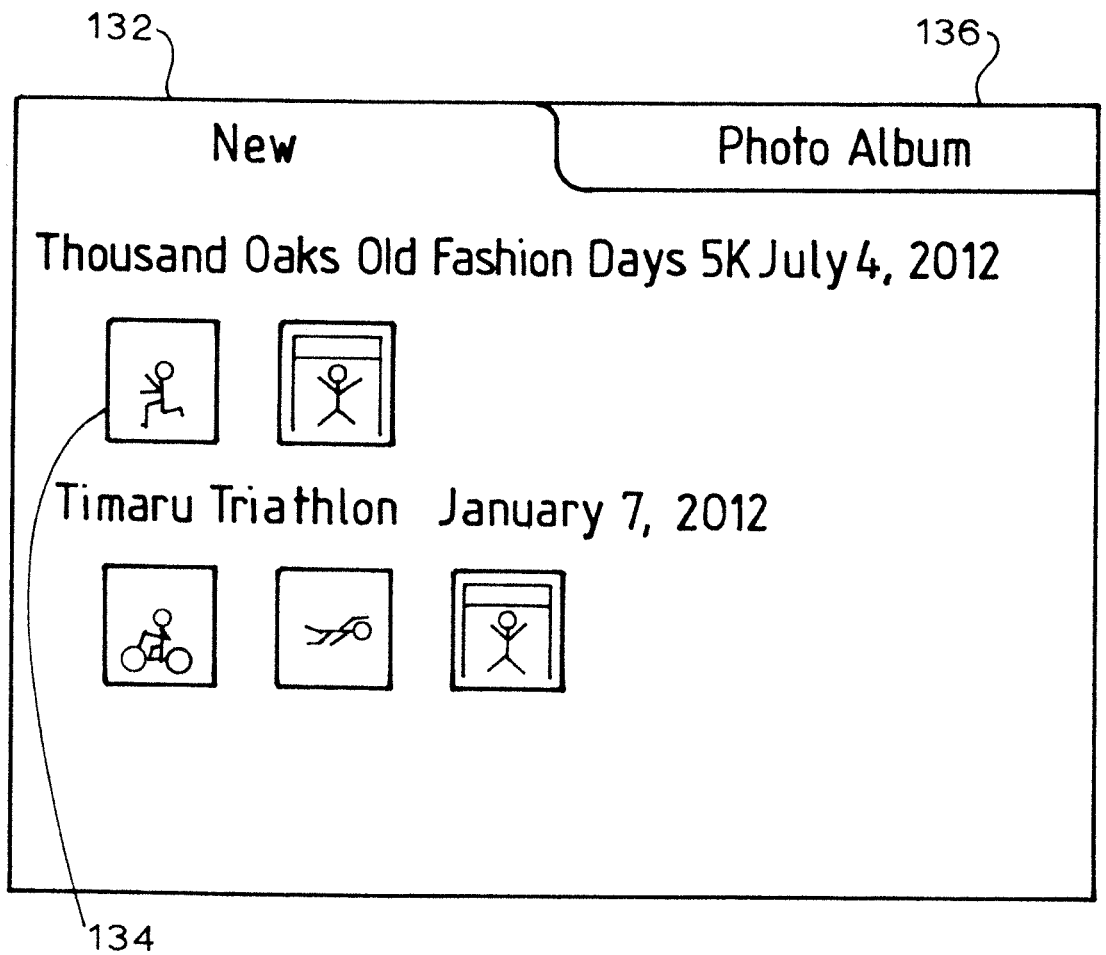
FIG. 6 is a preferred embodiment of a graphical user interface for use in generating a media portal permitting a user to access and purchase media content.

System 100 may be configured to automatically provide an athlete with their participation images as well as using images to enter the athlete in a sporting event and time the athlete. For example, referring to FIG. 3, device 128 may be configured to operate as a beacon. As the athlete approaches device 128, the athlete's wearable device detects a signal transmitted by a transmitter on device 128. The athlete's wearable device then signals a communications hub having a transceiver and microprocessor at photo zone 118, which initiates an image capturing process by alerting camera 106*c* of the approach of the athlete. Camera 106*c* captures the image of the athlete as the athlete passes through photo zone 118. The image captured by camera 106*c* is then uploaded to one or more of processor 102, the athlete's wearable device (if equipped with a receiver and memory), or directly to an online account associated with the athlete, such as a social media account or photo album 136 (FIG. 6). The uploading of the image may occur while the athlete is participating in the sporting event, or after the athlete completes the sporting event. Captured digital images may be delivered to the athlete in a variety of ways, for example only, as a multimedia file sent by SMS, as an attachment to an e-mail, or by direct data upload to a previously provided internet destination or account. Captured digital images may be merged (overlaid) with time and placement information if desired so that the athlete can easily determine at what point during the sporting event the image was taken.

Device 128 may be configured, if desired, as a sensor to detect the approach of an athlete using an electronic identification broadcast from the athlete's wearable device as they approach photo zone 118. Upon detecting the approach of an athlete, device 128 signals the communications hub at photo zone 118 to initiate the image capturing and delivery process described above. Contact details associated with the electronic identification broadcast may be provided by the athlete prior to the sporting event, or after the sporting event.

The foregoing description is by way of example only, and may be varied considerably without departing from the scope of the disclosure. For example only, instead of using a commencement image to compare with the profile image and enter the athlete into the sporting event, an athlete may be entered into the event by passing through a race-day photo chute leading to a restricted-access starting area. The athlete's entry into the sporting event would be recorded prior to commencement of the race through a comparison of the chute photo and the profile image, and the athlete may be timed using traditional means or through image recognition as desired. Where the sporting event charges an entry fee, in order to help ensure that all participants are paid entrants, an identification means such as a badge, tag, race number, patch, ribbon, etc., may be handed to the athlete as they pass through a restricted entry (e.g., the photo chute).

Athletes may then attach the identification means to themselves to show they are paid participants. The processor may be programmed to disregard athletes in finish images that do not have the identification means attached to themselves so as to restrict finish results to those who are registered and paid athletes.

If desired, the system may be used with a bib number as a secondary identification check. The system may be used with a timing chip if desired as a secondary timing check of the athlete's time. The system may be used without a digital image collection device at the start (for example, in the "chute" embodiment described above). In such a situation, the finish time may be determined by assuming the start time of the participant is zero and using the over-all clock time as the finish time of the participant. The system may be configured to digitalize photos or images from printed matter for use in identifying participants in those photos or images.

It will be appreciated that various embodiments described above may be configured for use with non-digital images as needed. As an alternative or supplement to secondary identification methods, an athlete may be identified by post-event searching for a profile image of an athlete on the internet. The post-event profile search may be conducted in situations where a pre-event athlete profile image is not suitable or sufficient for use in identifying the athlete an image captured during the sporting event.

If desired, as an alternative or supplement to obtaining a pre-event profile image to identify an athlete, identification of an athlete may be obtained after the athlete finishes the competition. For example, one or more images may be taken of the athlete after the athlete finishes, with the athlete providing their identification details to a terminal and/or person. This has the advantage of using an image in which the athlete's race-day attire is at least partially included in the photo in case the athlete's face is obscured in one of the timing images.

Non-stationary image collection devices may be utilized to capture images during a sporting event. For example, images may be obtained from an athlete participating in the sporting event using a wearable camera on either the top of the head, or as part of eyewear.

Image collection devices may be included only at the start if desired. Such a configuration may be preferable where the system is not intended for use in a timing situation.

A laser-emitter may be positioned at the starting line to create a laser detection grid to further enhance the accuracy of obtaining a commencement time. For example, an athlete encountering or passing through the laser detection grid would activate a sensor to record the precise time the athlete crosses the starting line. A camera may be synced to the sensor and take the digital commencement image of the athlete, which is then time-stamped and compared for race entry and/or timing purposes. A lighting system with one or more lights may be included to provide increased lighting where environmental factors create low lighting conditions.

If desired, the system may be configured in a preferred embodiment to search the internet for images of the user in athletic events, and populate the user's personal profile on a web platform with one or more of the images, which may be selectively added with the user's permission. This technique may be used to discover the user's participation in other athletic events and associate the user's participation data (e.g., finishing time, place and/or splits) from such events with a personal athletic event history as part of the personal profile. An example of a web platform having a database for maintaining an athlete's competition data is disclosed in U.S. Pat. No. 8,649,890, filed May 30, 2012, entitled "System and Method for Providing an Athlete with a Performance Profile," the entire disclosure of which is incorporated by reference herein.

The platform may be configured for use with activities other than running, cycling, swimming or multisport. For example only, the platform may be configured for use with sports such as kayaking, crew, hiking, and other sports, whether or not a timed component is involved.

Information or data normally stored at a physical location may be stored in the Cloud, considerably reducing the hardware needed for memory requirements often associated with large volumes of data.

The features described with respect to one embodiment may be applied to other embodiments, or combined with or interchanged with the features of other embodiments, as appropriate, without departing from the scope of the disclosure.

The present disclosure in one or more preferred forms provides the advantages of registering or entering athletes in a sporting event in a seamless manner and reduced opportunity for error. This permits better allocation of human resources and reduces material waste. From an athlete's perspective, more freedom is provided to train for and participate in a race knowing that a pre-registration entry fee will not be forfeited in case of a no-show.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A sporting event entry system for facilitating entry of an influx of people to a sporting event venue in a seamless manner to permit more efficient allocation of human resources at the venue, the system comprising:
   a camera configured to capture a pass-through image of the person as they pass through a restricted-access area of the sporting event;
   a sensor synced to said camera to initiate image capture as the person passes through the restricted area;
   a user image database configured to store a profile image of the user prior to commencement of the event, the profile image being configured to self-delete after at least one of a predetermined amount of time, and a predetermined action or event; and
   a processor configured to compare the profile image stored in said user image database with the pass-through image of the person captured by said camera using facial recognition technology, said processor being configured to permit entry of the person into the sporting event after determining the person is an authorized entrant as they move through the restricted access area of the sporting event based on the comparison between the profile image and the pass-through image.

2. The system of claim 1, wherein said user image database includes payment information associated with the person, said processor being configured to extract payment based on the payment information of the person after the person is permitted entry into the sporting event.

3. The system of claim 1, wherein said sensor is part of a laser detection grid.

4. The system of claim 1, wherein said camera is configured to capture the pass-through image after the person crosses a defined line.

5. The system of claim 1, wherein the restricted access area includes a chute.

6. The system of claim 1, wherein said processor is configured to permit entry of the person into the sporting event without receiving an indication prior to commencement of the sporting event that the person will be attending the sporting event.

7. The system of claim 1, wherein said camera includes a wireless communications module having at least one of a Wi-Fi radio and a Bluetooth radio.

8. The system of claim 1, wherein said sensor is part of a laser detection grid.

9. The system of claim 1, wherein said camera is configured to capture the pass-through image after the person crosses a defined line.

10. The system of claim 1, wherein the predetermined action or event is completion of the sporting event.

11. The system of claim 1, wherein the predetermined amount of time is 1 year.

12. A method of controlling entry of a person to a sporting event, comprising:
   storing, in a user image database, a digital profile image of the person prior to commencement of the sporting event;
   associating, with a processor, identification data of the person with the person's profile image;
   detecting an approach of the person with a sensor;
   capturing, with a camera synced to the sensor, a digital pass-through image of the person passing through a restricted access area of the sporting event;
   comparing the profile image stored in said user image database with the pass-through image of the person captured by the camera using facial recognition technology;
   permitting entry of the person into the sporting event after determining the person is an authorized entrant as they pass through the restricted access area of the sporting event based on the comparison of the profile image and the pass-through image; and
   automatically deleting the profile image after at least one of a predetermined amount of time, and a predetermined action or event.

13. The method of claim 12, wherein the entry of the person into the sporting event is conducted using only facial recognition technology.

14. The method of claim 12, further comprising charging the person an entry fee after permitting entry of the person into the sporting event.

15. The method of claim 12, wherein the restricted access area includes a chute.

16. The method of claim 12, further comprising conducting a pre-entry check to determine if the person is already registered with the sporting event before permitting entry of the person based on the comparison of the profile image and pass-through image.

17. A method of controlling entry of a person to a sporting event, comprising:
   storing, in a user image database, a digital profile image of the person prior to commencement of the sporting event;
   associating, with a processor, identification data of the person with the person's profile image;
   detecting an approach of the person with a sensor;
   capturing, with a camera synced to the sensor, a digital pass-through image of the person passing through a restricted access area of the sporting event;
   comparing the profile image, stored in said user image database with the pass-through image of the person captured by the camera using facial recognition technology;
   permitting entry of the person into the sporting event after determining the person is an authorized entrant as they pass through the restricted access area of the sporting event based on the comparison of the profile image and the pass-through image; and
   using a secondary method of identification to identify the person if the person remains unidentified after passing through the restricted area.

18. A method of controlling entry of a person to a sporting event, comprising:
   storing, in a user image database, a digital profile image of the person prior to commencement of the sporting event;
   associating, with a processor, identification data of the person with the person's profile image;
   detecting an approach of the person with a sensor;
   capturing, with a camera synced to the sensor, a digital pass-through image of the person passing through a restricted access area of the sporting event;
   comparing the profile image stored in said user image database with the pass-through image of the person captured by the camera using facial recognition technology;
   permitting entry of the person into the sporting event after determining the person is an authorized entrant as they pass through the restricted access area of the sporting event based on the comparison of the profile image and the pass-through image; and
   collecting an image at a terminal if the person remains unidentified after passing through the restricted area.

19. The method of claim 18, wherein the terminal is non-stationary.

* * * * *